United States Patent [19]
Hon et al.

[11] Patent Number: 5,506,764
[45] Date of Patent: Apr. 9, 1996

[54] ELECTRICAL POWER CONVERTER WITH STEP-GAPPED TRANSFORMER

[75] Inventors: Chau H. Hon, Kowloon; Cheung C. W. Jonathan, Kennedy Town, both of Hong Kong

[73] Assignee: Astec International, Ltd., Hong Kong

[21] Appl. No.: 189,441

[22] Filed: Jan. 31, 1994

[51] Int. Cl.⁶ .................................................. H02M 3/335
[52] U.S. Cl. .................................. 363/21; 336/178
[58] Field of Search ............................. 363/20, 21, 49, 363/98, 56, 165, 178

[56] References Cited

U.S. PATENT DOCUMENTS

| | | | |
|---|---|---|---|
| Re. 34,462 | 11/1993 | Whittle | 363/49 |
| 4,063,307 | 12/1977 | Stephens | 363/21 |
| 4,130,862 | 12/1978 | Holt | 363/49 |
| 4,282,567 | 8/1981 | Voigt | 363/15 |
| 4,326,244 | 4/1982 | Josephson | 363/56 |
| 4,695,936 | 9/1987 | Whittle | 363/21 |
| 4,887,199 | 12/1989 | Whittle | 363/49 |
| 5,155,676 | 10/1992 | Spreen | 363/126 |
| 5,267,133 | 11/1993 | Motomura et al. | 363/21 |

FOREIGN PATENT DOCUMENTS

61-278115  12/1986  Japan.

*Primary Examiner*—Peter S. Wong
*Assistant Examiner*—Adolf Berhane
*Attorney, Agent, or Firm*—Coudert Brothers

[57] ABSTRACT

An improved electrical power converter is disclosed. The electrical power converter utilizes a step-gapped power transformer having a ferromagnetic core, a primary winding, and one or more secondary windings. The ferromagnetic core is step-gapped such that it has a continuous portion and a gapped portion. A power switch, preferably a MOSFET, alternately couples an input voltage across the primary winding of the transformer, inducing voltage pulses across the secondary windings that are filtered to produce one or more output voltages. The gate terminal of the MOSFET is preferably driven by the voltage induced across a tertiary winding of the transformer.

23 Claims, 4 Drawing Sheets

FIG._4

ELECTRICAL POWER CONVERTER WITH STEP-GAPPED TRANSFORMER

FIELD OF THE INVENTION

The present invention relates to electrical power converters, and more particularly to power transformers for use with flyback electrical power converters.

BACKGROUND OF THE INVENTION

Electrical power converters are devices for processing electrical power from one form, such as an AC or unregulated DC voltage, into another form, such as one or more regulated DC output voltages. One conventional type of electrical power converter that produces a regulated output voltage is a switching power supply, also commonly referred to as a switch mode power supply or a switched power supply.

Conventional switching power supplies commonly include a power transformer and one or more power switches for alternately coupling an unregulated DC or rectified AC voltage across a primary winding of the power transformer in a series of voltage pulses. These pulses are transformed into a series of voltage pulses across one or more secondary windings of the power transformer and then rectified and filtered to provide one or more output DC voltages. Power transformers conventionally include a ferrite or tape-wound core and at least one primary and one secondary winding. Power switches commonly are metal-oxide semiconductor field-effect transistors (MOSFETs or FETs), although other types of transistors (such as bipolar junction power transistors, BJTs) are sometimes used.

The output voltage or voltages of the power converter are commonly regulated by controlling the duration of the voltage pulses coupled to the primary winding of the power transformer, thereby controlling the duration of the voltage pulses produced across the secondary windings of the power transformer. The relative amount of each switching cycle that the power switches are on, allowing power to be coupled to the power transformer, is referred to as the "duty cycle" at which the power converter is operating. For light loads (i.e., loads drawing a relatively small amount of power), the output voltage may be maintained by coupling a relatively small amount of power across the power transformer. Thus, for light loads, the power converter is operated at a low duty cycle, resulting in narrow (i.e. short duration) voltage pulses being coupled to the power transformer. Conversely, for heavy loads (i.e., loads drawing a relatively large amount of power), the output voltage is maintained by operating the power converter at a high duty cycle, with correspondingly wide voltage pulses being coupled to the power transformer.

One common type of switching power supply is the flyback power converter. In a conventional flyback converter, a rectifier is coupled to the secondary winding of the power transformer such that current is prevented from flowing through the secondary winding when voltage is coupled across the primary winding. Thus, at the beginning of each switching cycle of a flyback power converter, the power switch turns on and couples a voltage across the primary winding such that current in the primary winding ramps up from zero, thereby storing energy in the form of magnetic energy in the power transformer. The period of time during which the power switch is on is referred to as the drive cycle or drive period. Turn off of the power switch conventionally takes place in response to the level of an output voltage and/or the mount of current flowing through the primary winding of the power transformer. After the switch is turned off the energy stored in the power transformer is released through the secondary winding and filtered to produce the desired output voltage. The period of time during which energy is released from the secondary winding is referred to as the flyback cycle or flyback period. After essentially all stored energy is released, the power switch is again turned on and the switching cycle repeats. In conventional flyback power supplies, the power switch often is maintained in its ON state during the drive cycle by a tertiary winding of the power transformer. For example, the power switch is commonly a MOSFET having its gate coupled to a tertiary winding of the power transformer such that a sufficient voltage induced across the auxiliary winding will maintain the MOSFET in the ON state during the drive cycle.

Power transformers do not lend themselves easily to miniaturization and, thus transformers can place minimum size and cost limitations on power supply design. For this reason, one consideration in the design of electrical power converters is to minimize the size of the power transformer. To that end, an inductor (or choke) may be placed in parallel with the secondary winding of the power transformer. This increases the energy storage capability of the circuit for a given transformer size. However, due to the different times necessary to reset the cores of the inductor and the transformer a DC bias is induced in the power transformer core. The maximum acceptable DC bias point is temperature dependent because the saturation level of the core decreases when temperature increases. If the transformer is allowed to become saturated, excessive current is coupled through the power switch, causing the switch to fail.

As an alternative to using an energy storage choke, in certain electrical power converters the power transformer core has an air gap in it such that there is no closed magnetic circuit entirely within ferromagnetic material. For example, in certain converters having a toroidal core transformer, a gap separates two ends of the core. An air gap allows greater current capability before the onset of magnetic saturation preventing the saturation induced current and voltage spikes that can destroy power transistors. However, because air gaps decrease the average inductance of transformers, the size of the air gaps must be minimized. Otherwise the core size (and cost) of the transformer would have to be increased to provide the required level of inductance. An additional limitation of this approach is that the necessary gap length for many applications is too small to be obtained by conventional machining or taping.

As is well known in order to minimize the size of a flyback power transformer it is also preferable to operate the power converter at a high power switching frequency so that electrical current being conducted through the power transformer windings is less likely to reach a level sufficient to cause saturation of the transformer core. Problems with this approach, existing even if the transformer core has a conventional air gap, are related to the safe operating area (SOA) of the power switching device. In a power MOSFET, for example, the SOA is defined by the maximum drain current, the maximum drain-to-source voltage, and the maximum power dissipation. At high line input or light output load current (and thus low duty cycle), the gate-drive pulse for the power switch is relatively narrow (i.e., short in duration). At high switching frequencies, the pulse is often 500 nanoseconds or less in duration. Power switches require a finite amount of time to turn on fully (e.g., 100 nanoseconds). Thus, the power switch often is not completely turned for a high percentage of the drive cycle. A substantial amount of current nevertheless passes through the power switch during each drive cycle while the switch is not completely turned on. Such circumstances result in the power switch being required to dissipate a very large amount of power in the form of heat. In such cases, the maximum power dissipation level of the power switch is commonly exceeded and the switch is burned out.

At narrow pulses a phenomenon known as thermal runaway can also occur in some types of power switches (most commonly BJTs) even if the maximum power dissipation limits would not otherwise be exceeded. In such cases, the temperature of a switch rises due to power dissipation, and the higher temperature causes the switch to conduct more current, resulting in higher temperatures. This cycle of increasing temperatures and currents continues until excessively high temperatures are reached and the switch destroys itself. A similar effect can occur in small portions of the junction areas of transistors, causing a local thermal runaway known as "second breakdown." The phenomena of thermal runaway and second breakdown further limit the SOA of some switches.

Accordingly, there is a need for reducing the amount of power that must be dissipated in the power switch of a flyback electrical power converter operating at low duty cycles.

SUMMARY OF THE INVENTION

Broadly stated the present invention is an electrical power converter comprising an input port for receiving an input voltage and one or more output ports; a step-gapped transformer having a ferromagnetic core, a primary winding around said core and one or more secondary windings around said core, wherein said core has a continuous portion and a gapped portion; a power switch for alternately coupling said input voltage across said primary winding to produce voltage pulses across said one or more secondary windings, said power switch having a first conduction terminal a second conduction terminal and a control terminal that enables electrical current to be conducted between said first conduction terminal and said second conduction terminal when a sufficient voltage is coupled to said control terminal; switch control means for providing a series of voltage pulses to said control terminal such that said power switch is turned on and off in a series of switching cycles; and output circuit means coupled to said secondary windings for producing output voltages at said output ports from said voltage pulses across said one or more secondary windings.

A principal object of the present invention is to reduce power dissipation in electrical power converters operating at low duty cycles.

Another object of the present invention is to improve the turn-on/turn-off characteristics of a power switch in a switching power supply.

Still another object of the present invention is to provide for better utilization of the core of a power transformer in a power converter by building a step gap into the core that allows for higher power handling capability by the power converter.

Yet another object of the present invention is to provide a flyback electrical power converter in which the turn-on time of the switching element is not a problem at low duty-cycle switching.

A further object of the present invention is to provide a flyback electrical power converter having relatively low power dissipation at low duty cycles.

These and other objects of the present invention will become apparent to those skilled in the art from the following detailed description of the preferred embodiments, the accompanying drawings, and the appended claims.

DETAILED DESCRIPTION OF THE INVENTION AND PREFERRED EMBODIMENTS

Figure 1:
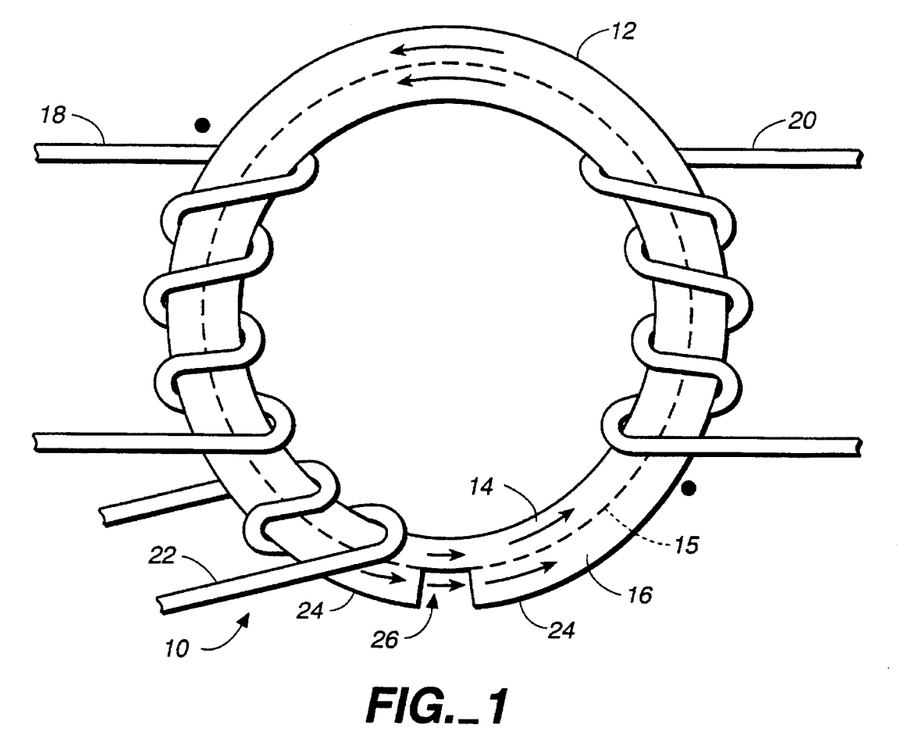
FIG. 1 shows a step-gapped transformer for use in an electrical power converter according to the present invention.

A step-gapped transformer for use in an electrical power converter according to the present invention is shown at 10 in FIG. 1. Step-gapped transformer 10 comprises a ferromagnetic core 12 having a continuous portion 14 and a gapped portion 16. Continuous portion 14 and gapped portion 16 are disposed concentrically with respect to each other as shown. In FIG. 1, for illustrative purposes, a dashed line 15 separates continuous portion 14 from gapped portion 16 at the inner periphery of said gapped portion and the outer periphery of said continuous portion. Obviously, the "continuous" portions and "gapped" portions of actual step-gapped transformers are not divided by a clear line as illustrated, and the magnetic circuits through each portion, discussed further below can overlap and interact with each other. These effects, however, need not be taken into account in order to make and use the present invention. The illustrated division of the ferromagnetic core 12 into continuous and gapped portions is sufficiently accurate for purposes of the present invention.

Portions 14 and 16 may be physically formed as a single piece of ferromagnetic material or from separate pieces of ferromagnetic material. Step-gapped transformer 10 further comprises a primary winding 18 having a predetermined number of turns wound around core 12, a secondary winding 20, having a predetermined number of turns preferably wound around the core with the opposite orientation from the primary winding (as shown), and a tertiary winding 22. The dots shown adjacent these windings indicate in a conventional manner this opposite orientation of the primary and secondary windings 18 and 20 in preferred embodiments of flyback power converters according to the present invention.

Figure 2:
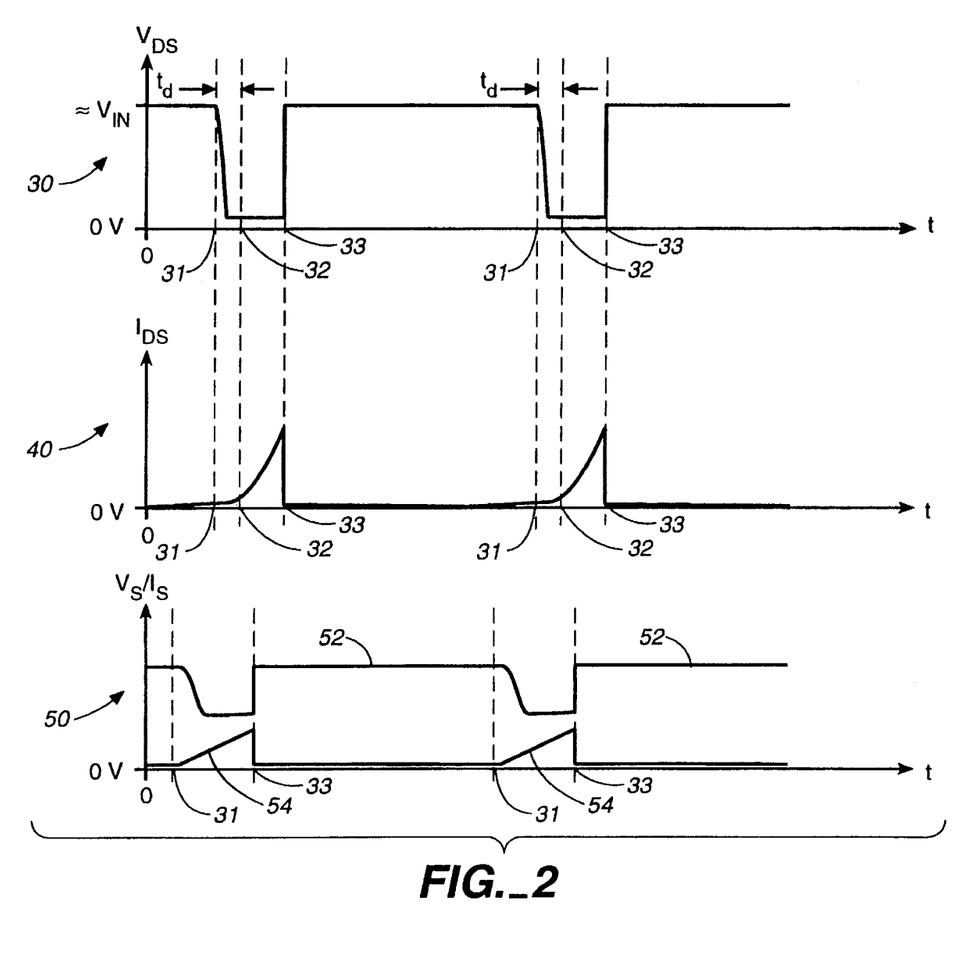
FIG. 2 shows timing diagrams illustrating the current and voltage through a power switching element of an electrical power converter according to the present invention.
Figure 3:
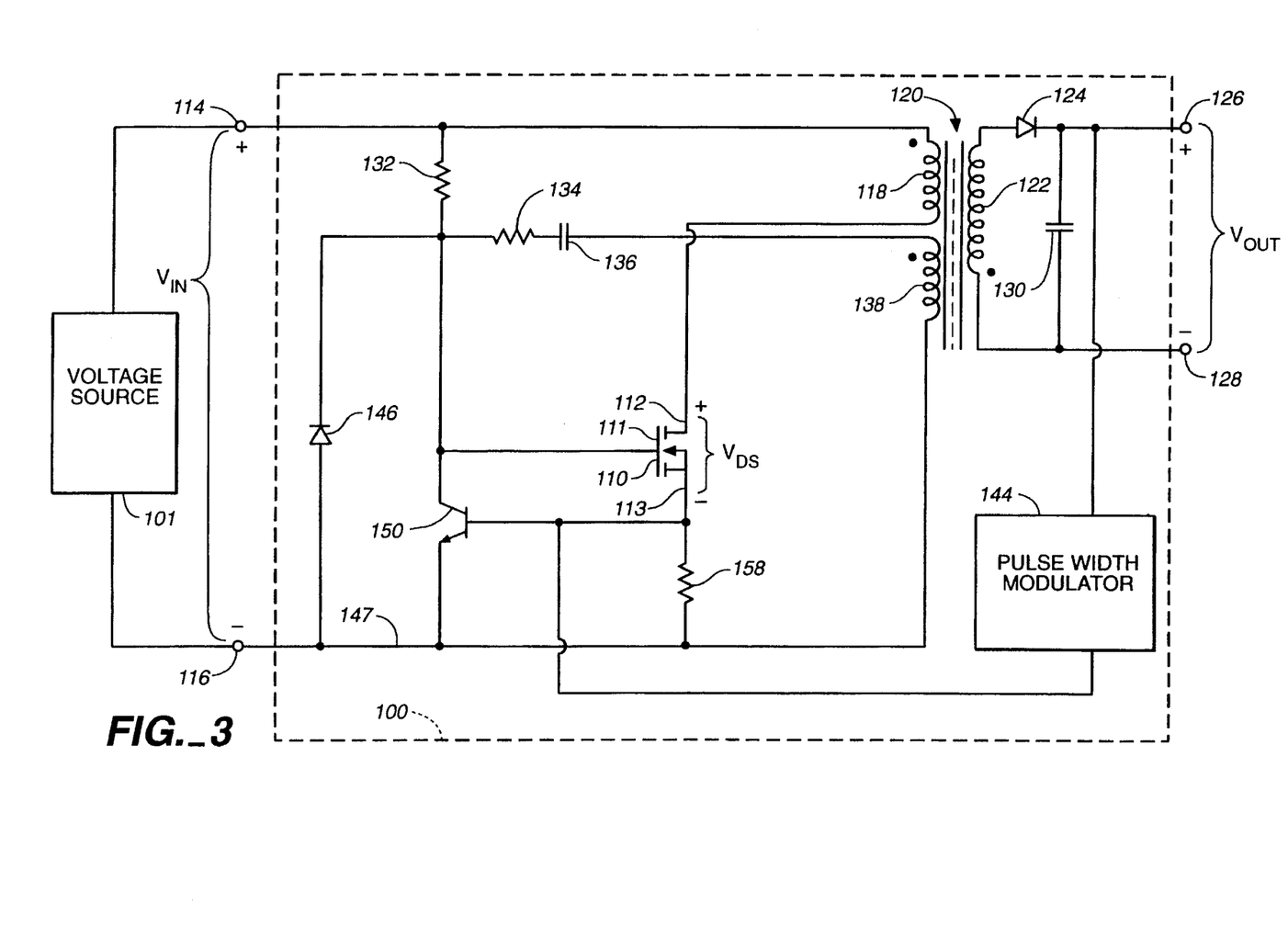
FIG. 3 is a circuit diagram showing an exemplary flyback power converter having a step-gapped transformer according to the present invention.
Figure 4:
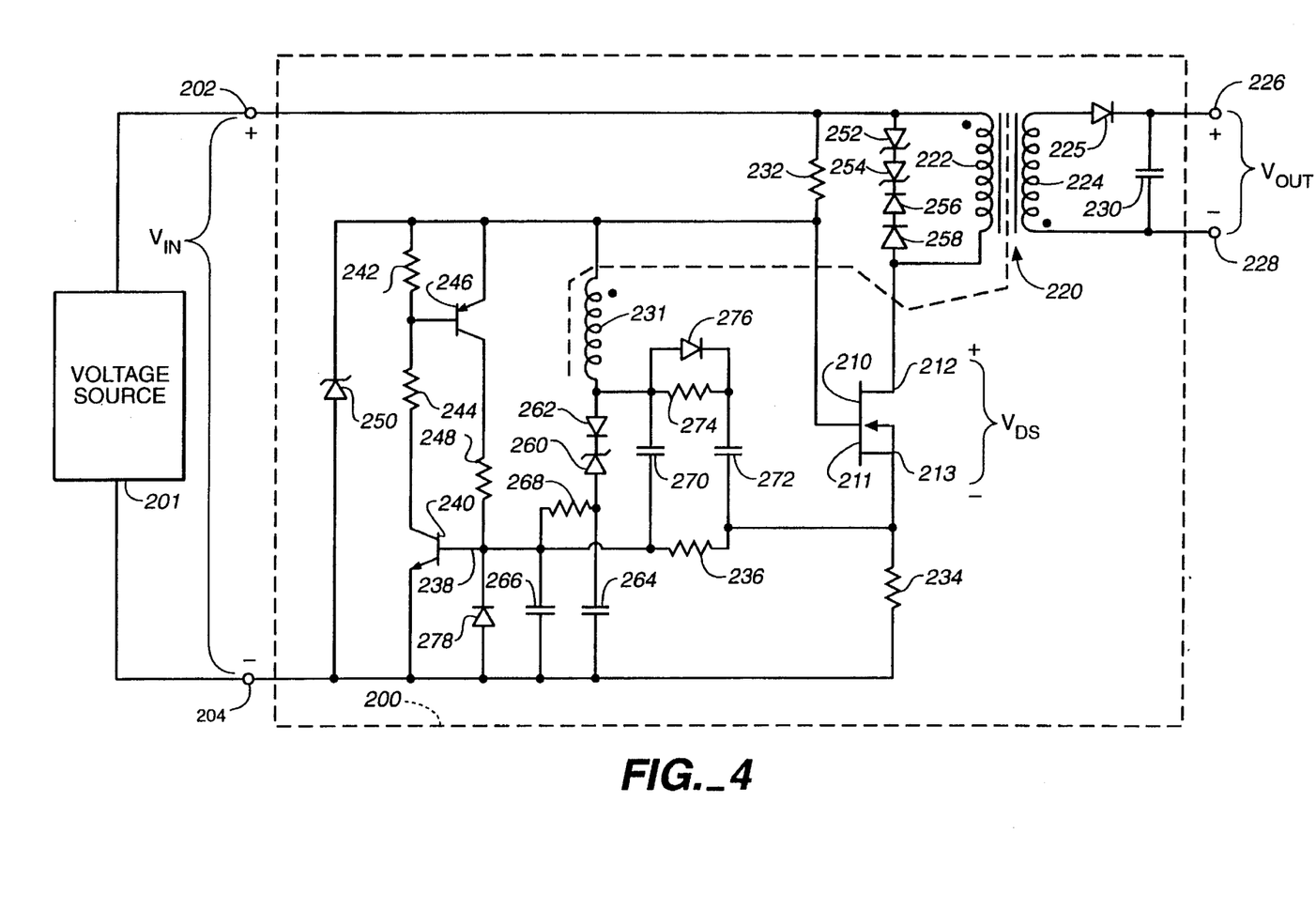
FIG. 4 is a circuit diagram showing a second exemplary flyback power converter having a step-gapped transformer according to the present invention.

Step-gapped transformer 10 may be used as a power transformer in a conventional electrical power converter, such as a flyback power converter. When so used, an unregulated DC or rectified AC voltage is alternately coupled across primary winding 18 in a series of voltage pulses by a power switch. These pulses are transformed into a series of voltage pulses across windings 20 and 22. The voltage pulses across secondary winding 20 are then rectified and filtered to produce an output voltage. Tertiary winding 22 is preferably coupled to the power switch on the primary side of the power converter (as shown in FIGS. 3 and 4, as described below) such that a sufficient voltage induced across winding 22 will maintain the power switch in its ON state during the drive cycle of the flyback power converter. An explanation of the use of step-gapped transformer 10 in electrical power converters is further described in connection with FIGS. 2, 3 and 4, below.

The magnetic flux through ferromagnetic core 12 is illustrated by arrows in FIG. 1. As illustrated, the flux lines form closed loops substantially confined within core 12 in the directions shown. Such closed loops of flux are conventionally viewed as magnetic circuits. The magnetic circuits of flux within portion 14 of core 12 is contained substantially within a continuous loop of ferromagnetic material, as shown. The flux through portion 16 of core 12 forms a magnetic circuit passing through a ferromagnetic portion 24 and a gapped portion 26, as shown. Portion 26 is preferably an air gap, although it may comprise other non-ferromagnetic substances. In a preferred embodiment, core 12 comprises a single piece of ferromagnetic material that is pre-cut such that portion 14 of the core 12 forms a continuous magnetic path whereas portion 16 forms a magnetic path with the introduction of an air gap 26.

The shape of core 12 may be any conventional mechanical ferrite construction that is capable of forming a magnetic closed loop to store energy. For example, toroidal, EI, UI, EC, RM, PQ, EE, and other such core types may be used. A toroidal core is shown in FIG. 1 for exemplary purposes only. As noted, the gapped and un-gapped portions 14 and 16 of core 12 may be two separate pieces of ferromagnetic material or parts of a single piece of ferromagnetic material. There is no major limitation on the size or shape of the core, so long as the step-gap in the core provides two magnetic paths, a magnetic path through the gapped portion and a magnetic path through the un-gapped portion.

As is well known, when used in conventional flyback converters, secondary winding 20 is wound around core 12 in the opposite orientation from primary winding 18 (as shown) and is magnetically coupled to primary winding 18. As explained above, when a voltage is applied across primary winding 18 within a conventional flyback power converter during the drive cycle, no current is permitted to flow through secondary winding 20. Thus, the primary winding initially behaves essentially as a simple inductor, with V=L dI/dt (ignoring the effects of any mutual inductance from current in tertiary winding 22). Thus, the rate at which the current ramps up in primary winding 18 upon application of a given voltage to winding 18 during the drive cycle is inversely proportional to the inductance.

During the drive cycle or period (i.e., voltage applied to winding 18) the current ramp is initially dependent on the continuous magnetic path portion 14 of core 12. Thus, the current ramp rate is relatively slow. But, when the magnetic flux in the continuous magnetic path portion reaches the saturation density portion 14 starts to saturate and effectively has characteristics similar to air. Thereafter, gap 26 in core 12 of transformer 10 reduces the mutual inductance of the transformer, and the related self inductance of the primary winding 18, thereby increasing the rate at which current is permitted to ramp up through the primary winding. This current waveform is shown in timing diagram 40 of FIG. 2, which is discussed further herein in connection with the circuits shown in FIG. 3 and FIG. 4. Timing diagram 50 of FIG. 2 shows an exemplary voltage waveform 52 and an exemplary current waveform 54 for the voltage $V_s$ across a power switch and the current $I_s$ through a power switch of a prior art power converter utilizing a prior art power transformer. As shown, current $I_s$ ramps up significantly before voltage $V_s$ reaches its minimum value, resulting in increased power dissipation.

FIG. 3 is a schematic diagram of a flyback switching power converter 100 having a step-gapped transformer 120 according to the present invention and a power switch 110 that is preferably a power MOSFET (hereinafter referred to as a "FET"). FET 110 has a control terminal comprising a gate terminal 111, and two conduction terminals identified as drain terminal 112 and source terminal 113. Drain terminal 112 is coupled to primary winding 118 of power transformer 120. A DC voltage source 101 having a voltage $V_{in}$ is coupled to input terminals 114 and 116 of converter 100. Voltage $V_{in}$ is coupled across primary winding 118 when FET 110 is in a conductive ON state, thereby causing current to be conducted through primary winding 118 and energy to be stored in power transformer 120 during the drive cycle of power converter 100. The energy stored in power transformer 120 is coupled to a secondary winding 122 during the flyback cycle of power converter 100, when FET 110 is switched to a non-conductive OFF state. Primary winding 118 and secondary winding 122 are magnetically coupled and wound around the core of transformer 120 with opposite orientations.

One end of secondary winding 122 is coupled to the anode of a rectifier 124 and the other end is coupled to an output terminal 128. The cathode of rectifier 124 is coupled to another output terminal 126. A storage capacitor 130 is connected across output terminals 126 and 128. Terminals 126 and 128 deliver output voltage $V_{out}$ to an external load (not shown). As a result of transformer action, the voltage across secondary winding 122 is of a polarity such that rectifier 124 becomes forward biased during non-conducting intervals of FET 110 (that is, during the flyback cycle). During each flyback cycle of power converter 100, secondary winding 122 supplies an output current which is conducted through rectifier 124. Consequently, the energy stored in power transformer 120 is transferred to output terminals 126 and 128 and capacitor 130. During the drive cycles of power converter 100, the voltage across secondary winding 122 is of a polarity that rectifier 124 becomes reversed biased, and the output voltage $V_{out}$ at terminals 126 and 128 is maintained by storage capacitor 130.

The gate terminal 111 of FET 110 is coupled to a starting resistor 132, which is, in turn, coupled to voltage source 101 through input terminal 114. When voltage source 101 is first coupled to input terminal 114, starting resistor 132 raises the potential of gate terminal 111 of FET 110, thereby turning on FET 10. Thereafter, FET 110 is switched on and off periodically, as explained below.

Periodic switching of FET 110 from a non-conductive OFF state to a conductive ON state is accomplished in response to a regenerative feedback drive circuit which includes a tertiary winding 138 of power transformer 120 and a series RC network including a resistor 134 and capacitor 136. The feedback drive circuit is coupled to the gate terminal 111 of FET 110. As is well-known in the art, the ringing induced by the magnetizing inductance of transformer 120 at the end of each conduction interval of rectifier 124 is fed back through the RC network and induces FET 110 to turn on and begin the next cycle.

After FET 110 has been turned on, the voltage at the gate terminal of FET 110 is also maintained by means of the feedback drive circuit. When a current is conducted through primary winding 118 as a result of FET 110 being in a conductive ON state, the dotted side of winding 138 has a positive voltage and the undotted side has a negative voltage due to transformer action. The voltage of winding 138 is coupled to the gate terminal of FET 110 via resistor 134 and capacitor 136, thereby keeping FET 110 in its conductive state. A diode 146 is connected between a common line 147, which is coupled to input terminal 116 and gate terminal 111 of FET 110. Diode 146 provides a return path to recharge capacitor 136 when FET 110 later becomes non-conductive.

The periodic turning off of FET 110 is in response to a turn off circuit comprising a pulse width modulator 144 and a switch 150 acting as a gate current sink. Switch 150 is a conventional bipolar junction transistor in a preferred embodiment of the invention. Pulse width modulator 144 is conventional and is widely used in prior art switching converters for regulating the output voltage. In response to a signal generated by pulse width modulator 144, switch 150 will be in a conductive ON state for a period of time. As a result during this time period, switch 150 pulls the gate of FET 110 to a value close to or below the voltage of the FET's source terminal 113. Thus, FET 110 is turned off. Conversely, when switch 150 is turned off in response to a signal from pulse width modulator 144, switch 150 acts as an open circuit. During such time periods the state of FET 110 is determined by the voltage generated by resistor 132 and the feedback drive circuit.

The input terminal of pulse width modulator 144 is preferably coupled to the secondary side of converter 100 for sensing the output voltage $V_{out}$. Pulse width modulator 144 generates a plurality of pulses having a width related to the difference between the level of output voltage $V_{out}$ and a predetermined nominal voltage level. Since the output terminal of pulse width modulator 144 is connected to switch 150 (e.g., to the base of the bipolar junction transistor conventionally used as switch 150), these pulses control the ON/OFF states of switch 150. Thus, pulse width modulator 144 is part of a regulation circuit for regulating the output voltage $V_{out}$ across output terminals 126 and 128 about said nominal voltage level.

When FET 110 changes from an ON state to an OFF state, the energy stored in primary winding 118 causes the voltage at drain terminal 112 to be higher than the voltage at input terminal 114, as a result of the inductive action of winding 118. After most of the energy stored in power transformer 120 has been transferred to capacitor 130 or the external load, the voltage at drain terminal 112 of FET 110 begins to fall, since there is no longer enough energy in transformer 120 to maintain the drain voltage. As the drain voltage falls, it induces a positive voltage at the dotted terminal of feedback winding 138. Consequently, FET 110 is turned back on, as explained above. As a result, FET 110 has periodic on and off cycles.

Converter 100 preferably also includes a resistor 158 connected between the source terminal 113 of FET 110 and common line 147. The value of resistor 158 is chosen such that when the current flowing through FET 110 reaches a maximum allowable safe value, the voltage across resistor 158 is sufficient to turn switch 150 on. As a result, resistor 158 functions to cause FET 110 to be turned off in a manner so as to prevent excessive current from flowing through FET 110.

As noted above, a step-gapped transformer according to the present invention is used as transformer 120 of power converter 100. Windings 18, 20 and 22 of transformer 10, shown in FIG. 1, correspond to windings 118, 122 and 138, respectively, of transformer 120, shown in FIG. 3. Thus, when FET 110 is turned on, the voltage $V_{DS}$ across the drain 112 and source 113 of FET 110 is reduced from a value approximately equal to $V_{in}$ to a value approximately equal to zero, with the result that $V_{in}$ is coupled across winding 118. When FET 110 is turned off, voltage $V_{DS}$ increases from a value of approximately zero to a value of approximately $V_{in}$, with the result that there is no longer substantial voltage across winding 118. A series of such switching cycles occurs and is illustrated by a timing diagram 30 in FIG. 2. At each time 31, as illustrated, FET 110 is turned on and voltage $V_{DS}$ is reduced from a value of approximately $V_{in}$ to a value of approximately zero. At each time 33, FET 110 is turned off and voltage $V_{DS}$ is returned to a value of approximately $V_{in}$.

As a result of FET 110 being turned on, the current $I_{DS}$ through winding 118 and FET 110 begins to ramp up as shown in timing diagram 40 of FIG. 2. This occurs for a period of time $t_d$ until time 32 at a relatively slow rate, while the current is dependent on the continuous portion of transformer 120. Between time 32 and time 33, the continuous portion of transformer 120 is substantially saturated and therefore the inductance depends on the gapped portion of the core of transformer 120, with the result that the inductance is lower. Thus, the current $I_{DS}$ through winding 118 and FET 110 is permitted to ramp up at a higher rate. Thus, step-gapped transformer 120 causes a reduced amount of current to flow through FET 110 for a period of time $t_d$, thereby preventing excessive power dissipation by current conducted through FET 110 before it is fully turned on. After FET 110 is turned ON, the step-gapped portion of the core of transformer 120 permits increased current flow through FET 110.

Timing diagrams 30 and 40 and the accompanying descriptions given above represent general characteristics of the voltage and current of switches used with step-gapped transformers according to the present invention. It will be appreciated by those skilled in the art that the particular circuit shown in FIG. 3 is exemplary only, and that a step-gapped transformer according to the present invention may be used in any other conventional power converter, preferably having a power switch with a control terminal responsive to a tertiary transformer winding.

Another exemplary flyback power converter having a step-gapped transformer according to the present invention is shown at 200 in FIG. 4. The illustrated flyback power converter 200 is designed for use with an input voltage in the range of 180 volts DC to 400 volts DC. Power converter 200 is a free-running flyback converter that does not utilize a separate, conventional pulse width modulator for turning on and/or turning off power switch 210 in response to an output voltage sensed by the pulse width modulator. Rather, power switch 210 of power converter 200 is turned on in response to the voltage across a tertiary winding 231 and turned off in responses to the value of the current through power switch 210, as explained further below.

A step-gapped transformer according to the present invention is particularly useful with free-running flyback converters such as flyback power converter 200 for the following reasons. Power converter 200 is preferably operated at high switching frequencies (in the range of 400 kHz to 700 kHz) in order to allow use of a relatively small flyback transformer. As is well-known, however, the duty cycle of the converter is often limited to a maximum of about 25% in order to limit the secondary voltage reflected on the primary during transformer reset to a safe value and to better control noise. The combination of high frequency switching and low duty cycle results in short-duration drive cycles or "on-time" of the power switch. At a switching frequency of 500 KHZa and a 25% duty-cycle, for example, the drive cycle/on-time of the power switch is approximately 500 nanoseconds in duration. The power switch in power converter 200 takes a finite period of time to turn on fully (e.g. 100 nanoseconds). Thus, in the absence of a step-gapped transformer, the switch may not be fully turned on for a relatively high percentage of the drive cycle. In fact, the current through the transformer primary winding may reach a value sufficient to cause the switch to turn off before it is fully turned on. As described above, these operating conditions cause switching and conduction power losses in the power switch and may cause power switch failure due to thermal runaway or operation beyond the safe operating area.

Using a combination iron/powder/ferrite core (i.e., transformer windings around both a ferrite core and an iron powder core) helps to solve the above problem of undesireable power losses in the power switch, but the size of such a transformer is often undesirably large. Furthermore, the core losses for power ferrite in a step-gapped transformer will be lower than for a partially iron powder core at the switching frequencies of interest. For this reason, a step-gapped transformer according to the present invention is superior to a combined iron powder ferrite core.

Flyback power converter 200 has input terminals 202 and 204 coupled to voltage source 201 having a voltage $V_{in}$ such that the voltage at terminal 202 is higher (indicated with a "+") than the voltage at terminal 204, which is indicated with a "−". Power converter 200 uses a power switch comprising a FET 210. FET 210 has a switch control terminal 211 and two conduction terminals 212 and 213, referred to as the gate terminal, the drain terminal and the source terminal, respectively, of FET 210. When FET 210 is in a conductive ON state during the drive cycle of power converter 200, voltage $V_{in}$, is coupled across primary winding 222 of power transformer 220, thereby causing current to be conducted through primary winding 222 and energy to be stored in power transformer 220. The energy stored in power transformer 220 is coupled to a secondary winding 224 of power transformer 220 during the flyback cycle of power converter 200 when FET 210 is switched to a non-conductive OFF state. Power transformer 220 is a step-gapped transformer wherein windings 220, 224, and 231 correspond, respectively, to windings 18, 20, and 22 shown in FIG. 1.

One end of secondary winding 224 is coupled to the anode of rectifier 225 and the other end is coupled to an output terminal 228. The cathode of rectifier 225 is coupled to another output terminal 226. A storage capacitor 230 is coupled between output terminals 226 and 228. Terminals 226 and 228 deliver output voltage $V_{out}$ to an external load (not shown). As a result of transformer action, the voltage across secondary winding 224 is of a polarity such that rectifier 224 is forward biased during non-conducting intervals of FET 210, that is, during the flyback cycles of power converter 200, and reversed biased during conducting intervals of FET 210, that is, during the drive cycles of power converter 200. Gate terminal 211 of FET 210 is coupled to a starting resistor 232 which is, in turn, coupled to voltage source 201 through input terminal 202. When voltage source 201 is first coupled to input terminal 202, starting resistor 232 raises the potential of gate terminal 211 of FET 210, thereby turning on FET 210. During the ON state of FET 210, tertiary winding 231 of power transformer 220 supplies sufficient voltage to gate 211 to maintain FET 210 in its ON state. Zener diode 250 limits the voltage at the gate terminal 211 of FET 210 in a conventional manner, by allowing current to flow from the dotted end of winding 231 through zener diode 250 to the undotted end of winding 231, by way of diode 278 and capacitor 270. Thereafter, FET 210 is switched on and off periodically, in a manner as described below.

Power converter 200 further includes resistor 234 and 236 coupled to the drain of FET 210. The other end of resistor 234 is coupled to input terminal 204. The other end of resistor 236 is coupled to the base 238 of a current sink transistor 240. As the current through FET 210 ramps up, the voltage across resistor 234 rises, eventually resulting in a base current through resistor 236 to the base 238 of current sink transistor 240 that is sufficient to turn on transistor 240. When transistor 240 is turned on, current is conducted through resistors 232, 242, and 244. This, in turn, results in a voltage being applied to the base of a second current sink transistor 246 and, consequently, current being conducted through transistor 246 and resistor 248 to supply additional base current at the base 238 of transistor 240. Thus, transistor 240 will remain on, and the voltage at gate 211 of FET 210 will be lowered until FET 210 is turned off. Turning off of gate 211 is enhanced by transformer action resulting in the decrease of the voltage at the dotted terminal of winding 231 when current through winding 222 is reduced. At this point, energy stored in power transformer 220 will be coupled to output terminals 226 and 228 as discussed earlier in connection with FIG. 3.

Periodic switching of FET 210 from a non-conductive OFF state to a conductive ON state is accomplished in response to the ringing induced by the magnetizing inductance of transformer 220 at the end of conduction of rectifier 225 producing a positive voltage at the gate of FET 210. Turn-on is aided by the voltage stored on capacitors 270 and 272, which adds to the voltage induced across winding 231. Voltage is stored on capacitors 270 and 272 by current from winding 231 during the flyback period, when the undotted terminal of winding 231 has a higher voltage. The voltage stored on capacitor 270 also pulls down the voltage at base 238 when the undotted end of winding 231 becomes low, turning off transistors 240 and 246. Current is conducted to capacitor 272 directly through a diode 276, but a resistor 274 limits the rate at which capacitor 272 can discharge. As FET 210 is turned on, voltage $V_{in}$ is coupled across primary winding 222, and a voltage is induced across tertiary winding 231. As explained above, this voltage maintains FET 210 in its ON state during the drive cycle of power converter 200.

FET 210, therefore, is switched on and off in a series of switching cycles, the drain to source voltage $V_{DS}$ during such cycles being shown in timing diagram 30 of FIG. 2, which was explained above. Because transformer 220 is a step-gapped transformer, current is conducted through FET 210 at a reduced rate for a period $t_d$, as shown in timing diagram 40 of FIG. 2, which was explained above allowing FET 210 to be more fully turned on before current begins to flow through FET 210 at an increased rate. In this manner, as explained above, power dissipation in FET 210 is reduced.

Zener diodes 252 and 254 and rectifiers 256 and 258 are coupled across primary winding 222 as shown to limit the voltage across primary winding 222 in a conventional manner. Similarly, zener diode 260 and rectifier 262 limit the voltage across tertiary winding 231 by providing a current path at excessive voltages, from the undotted terminal of tertiary winding 231 through capacitor 264 and zener diode 250 to the dotted terminal of tertiary winding 231. During such a period, current will also flow through a resistor 268 to capacitor 266. Consequently, excessive voltages stored on filter capacitor 230, which also cause excessive voltages at the undotted terminal of tertiary winding 231, result in current flowing through resistor 268 and a voltage across capacitor 266 of sufficient level so as to cause transistor 240 to be turned on and thus FET 210 turned off in a manner as described above. Additional current is provided to base 238 when capacitor 264 discharges through resistor 268. This feedback circuit prevents excessive voltages from being stored on capacitor 230 by limiting the amount of time that FET 210 is on when high voltages are stored on capacitor 230.

The present invention has been described with respect to particular embodiments of flyback power converters, but its utility is not limited to these converters. This invention is particularly useful for power converters in which the current through the primary winding of the transformer ramps up and the conduction time of the current through the transformer primary winding is sometimes short, especially for conduction times on the order of a nanosecond.

While the present invention has been particularly described with respect to the illustrated embodiments, it will be appreciated that various alterations, modifications, and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, to the contrary, is intended to cover various modifications and equivalent arrangements that are within the scope of the appended claims.

What is claimed is:

1. An electrical power converter, comprising:

an input port for receiving input voltage and one or more output ports;

a step-gapped transformer having a ferromagnetic core, a primary winding around said core, and one or more secondary windings around said core, wherein said core has a continuous portion and a gapped portion, said continuous portion being arranged to saturate at a substantially lower current than said gapped portion; a power switch for alternately coupling said input voltage across said primary winding to produce pulse-width-modulatable voltage pulses across said one or more secondary windings, said power switch having a first conduction terminal, a second conduction terminal, and a control terminal that enables electrical current to be conducted between said first conduction terminal and said second conduction terminal when a sufficient voltage is coupled to said control terminal;

switch control means for providing a series of voltage pulses to said control terminal such that said power switch can be turned on and off in a series of switching cycles at a frequency and duty cycle sufficient to cause thermal damage to said power switch in the absence of said step-gapped transformer; and output circuit means coupled to said secondary windings for producing output voltages at said output ports from said voltage pulses across said one or more secondary windings.

2. The electrical power converter of claim 1, wherein said switch control means comprises a tertiary winding around said core, said tertiary winding being coupled to said control terminal.

3. The electrical power converter of claim 1, wherein said core is ferrite.

4. The electrical power converter of claim 1, wherein said core is substantially toroidal.

5. The electrical power converter of claim 4, wherein said continuous portion is substantially circular and said gapped portion is substantially circular and has an air gap formed therein, said continuous portion and said gapped portion being disposed concentrically with respect to each other.

6. The electrical power converter of claim 5, wherein said continuous and gapped portions of said core comprise a single piece of ferrite.

7. The electrical power converter of claim 5, wherein said continuous portion has an outer periphery, said gapped portion has an inner periphery, and said outer periphery of said continuous portion is disposed adjacent to said inner periphery of said gapped portion.

8. The electrical power converter of claim 1, wherein said power converter is a flyback power converter.

9. The electrical power converter of claim 8, wherein said output circuit means comprises a filter circuit.

10. The electrical power converter of claim 8, wherein said output circuit means further comprises a rectifier coupled to at least one of said secondary windings such that current is substantially prevented from being conducted through said one secondary winding when said input voltage is coupled across said primary winding and current is permitted to be conducted through said one secondary winding when said input voltage is not coupled across said primary winding.

11. The electrical power converter of claim 1, wherein said power switch is a MOSFET having a gate, a drain and a source and wherein said control terminal is said gate of said MOSFET.

12. The electrical power converter of claim 11, wherein said first conduction terminal is said drain of said MOSFET and said second conduction terminal is said source of said MOSFET, said drain being coupled to said primary winding.

13. The converter of claim 1, in which said frequency is substantially in the range of 400–700 kHz, and said duty cycle is substantially 25%.

14. A flyback electrical power converter, comprising:

an input port for receiving an input voltage and one or more output ports;

a step-gapped transformer having a ferromagnetic core, a primary winding around said core, one or more secondary windings around said core, and a tertiary winding around said core, wherein said core has a continuous portion and a gapped portion, said continuous portion being arranged to saturate at a substantially lower current than said gapped portion;

a power switch for alternately coupling said input voltage across said primary winding at a frequency and duty cycle sufficient to cause thermal damage to said power switch in the asbence of said step-gapped transformer, said power switch having a first conduction terminal, a second conduction terminal, and a control terminal that enables electrical current to be conducted between said first conduction terminal and said second conduction terminal when a sufficient voltage is coupled to said control terminal, said control terminal being coupled to said tertiary winding;

a rectifier coupled to said secondary windings such that current is substantially prevented from being conducted through said secondary windings when said input voltage is coupled across said primary winding; and an output filter circuit coupled to said secondary windings for providing output voltages at said output ports.

15. The flyback electrical power converter of claim 14, wherein said core is toroidal.

16. The flyback electrical power converter of claim 14, wherein said core is ferrite.

17. The flyback electrical power converter of claim 14, wherein said power switch is a MOSFET having a gate, a drain and a source, and wherein said control terminal is said gate of said MOSFET.

18. The converter of claim 14, in which said frequency is substantially in the range of 400–700 kHz, and said duty cycle is substantially 25%.

19. In a flyback power converter including a transformer having a magnetic core, a primary winding and a secondary winding, said converter using a switching transistor to apply current pulses to said primary winding at a frequency and duty cycle sufficient to cause thermal damage to said switching transistor in the absence of said step-gapped transformer, the improvement comprising said core having a first portion forming a continuous magnetic circuit, and a second portion forming a gapped magnetic circuit, said core having a first inductance when said first portion is unsaturated, and a second inductance when said first portion is saturated, said first inductance being higher than said second inductance said first inductance being sufficient to substantially limit the current through said switching transistor during the portion of said pulses in which said switching transistor is not substantially fully turned on.

20. The improvement of claim 19, in which said transistor is a field effect transistor.

21. The improvement of claim 19, in which the duration of said current pulses in substantially 500 nanoseconds.

22. A method of preventing thermal runaway in switching transistors of a power converter wherein said switching transistors provide current pulses to the primary winding of a transformer having a core and primary and secondary windings, said current pulses being so narrow that said switching transistor is not fully turned on during a first portion of said pulses, said method comprising the steps of:

a) providing said core with a first portion forming a continuous magnetic path through said windings, and a second portion forming a gapped path through said windings;

b) saturating said first core portion during said first portion of said pulses; and c) maintaining said second core portion in an unsaturated condition during at least a second portion of said pulses;

d) whereby said core exhibits a high inductance limiting the current rise through said switching transistors during said first pulse portion, and a lower inductance allowing a higher current rise through said switching transistors during said second pulse portion.

23. The converter of claim 19, in which said frequency is substantially in the range of 400–700 kHz, and said duty cycle is stubstantially 25%.

* * * * *